United States Patent
Egglhuber et al.

(10) Patent No.: US 6,640,796 B2
(45) Date of Patent: Nov. 4, 2003

(54) METHOD FOR SEPARATING SLICES FROM A HARD BRITTLE WORKPIECE, AND WIRE SAW FOR CARRYING OUT THE METHOD

(75) Inventors: Karl Egglhuber, Hebertsfelden (DE); Jörg Lukschandel, Kempten (DE)

(73) Assignee: Wacker Siltronic Gesellschaft fur Halbleitermaterialien AG, Burghausen (DE)

(*) Notice: Subject to any disclaimer, the term of this patent is extended or adjusted under 35 U.S.C. 154(b) by 0 days.

(21) Appl. No.: 10/209,115

(22) Filed: Jul. 31, 2002

(65) Prior Publication Data

US 2003/0034022 A1 Feb. 20, 2003

(30) Foreign Application Priority Data

Aug. 14, 2001 (DE) .......................................... 101 39 962

(51) Int. Cl.[7] .................................................. B28D 1/08
(52) U.S. Cl. .................... 125/21; 125/12; 125/16.01; 125/16.02
(58) Field of Search .............................. 125/12, 16.01, 125/16.02, 21

(56) References Cited

U.S. PATENT DOCUMENTS 4,655,191 A * 4/1987 Wells et al. ................... 125/16
6,237,585 B1 * 5/2001 Oishi et al. ............... 125/16.02

FOREIGN PATENT DOCUMENTS

| DE | 3716943 | * 12/1988 | ............ B28D/5/00 |
| EP | 0885679 | 12/1998 | |
| EP | 0953416 | 11/1999 | |

OTHER PUBLICATIONS

English Derwent Abstract AN 1998–354654 corresponding to DE 3716943.

* cited by examiner

Primary Examiner—Joseph J. Hail, III
Assistant Examiner—Shantese McDonald
(74) Attorney, Agent, or Firm—Collard & Roe, P.C.

(57) ABSTRACT

A method for separating slices from a hard brittle workpiece involves subjecting the workpiece to an advancing movement and pressing it onto wires of a wire web of a wire saw, the wires being under a defined wire tension and making contact with the workpiece over a cutting depth along a cutting contour. The wires are lifted off the cutting contour an number of times while the wire tension is kept substantially unchanged, with the aid of rolls of a roll system. The roll system comprises at least one roll that is moved onto the wire web and back, the roll system comprising at least two moveable rolls which flank the workpiece. A wire saw is suitable for carrying out the method.

19 Claims, 4 Drawing Sheets

METHOD FOR SEPARATING SLICES FROM A HARD BRITTLE WORKPIECE, AND WIRE SAW FOR CARRYING OUT THE METHOD

BACKGROUND OF THE INVENTION

1. Field of the Invention

The invention relates to a method for separating slices from a hard brittle workpiece, and to a wire saw which is suitable for this method. The method is suitable in particular for separating semiconductor wafers from a crystal, for example from a silicon single crystal.

2. The Prior Art

Wafers of this type must have sides which are particularly planar and parallel to one another if they are to be useable as base material for the fabrication of electronic components. Therefore, enormous effort is dedicated to satisfying the requirements. There is also considerable interest in getting as close to the objective as possible even during separation of the slices, since subsequent working steps required to improve the geometry, such as lapping or polishing, can then be made easier or even eliminated altogether.

The surfaces of semiconductor wafers which have been produced with the aid of a standard wire saw, on closer examination, have a surface structure with score marks and undulations. This unevenness has to be eliminated in subsequent machining steps, which requires a relatively large amount of material to be removed and therefore a considerable amount of time is required.

European Patent No. EP-885679 A1 has described a complex method in which the accuracy of the cutting profile is increased by pivoting the wire web out of the horizontal plane against the running direction of the wires.

SUMMARY OF THE INVENTION

It is therefore an object of the present invention to provide a method that is simple to carry out and which forms slices which require less material to be removed in subsequent machining steps.

The invention relates to a method for separating slices from a hard brittle workpiece, in which the workpiece is subjected to an advancing movement and is pressed onto wires of a wire web of a wire saw, the wires being under a defined wire tension and making contact with the workpiece over a cutting depth along a cutting contour. The wires are lifted off the cutting contour a number of times, i.e., repeatedly, while the wire tension is kept substantially unchanged. This is accomplished with the aid of rolls of a roll system, as a result of at least one roll being moved onto the wire web and back off. The roll system comprises at least two moveable rolls which flank the workpiece.

The cutting contour is formed when the wires engage in the workpiece and is of the same length as the engagement length (contact length) of a wire. It is in the shape of an arc, since the wires yield slightly under the pressure of the workpiece. The cutting depth is the maximum depth of the cutting gap which is formed when the wires penetrate into the workpiece. Unlike a conventional wire-sawing method, in which the wires remain in contact with the cutting contour over the maximum engagement length, the wires are lifted off the cutting contour a number of times, i.e., repeatedly, preferably at periodic intervals, through an angle α, with the aid of the roll system. In the process, they move through the cutting gap and, by interacting with a sawing slurry or with abrasive grain which is bonded to the wires, reduce undulations and score marks at the side faces of the cutting gap.

BRIEF DESCRIPTION OF THE DRAWINGS

Other objects and features of the present invention will become apparent from the following detailed description considered in connection with the accompanying drawings. It is to be understood, however, that the drawings are designed as an illustration only and not as a definition of the limits of the invention.

In the drawings, wherein similar reference characters denote similar elements throughout the several views.

DETAILED DESCRIPTION OF THE PREFERRED EMBODIMENT

Figure 1A:
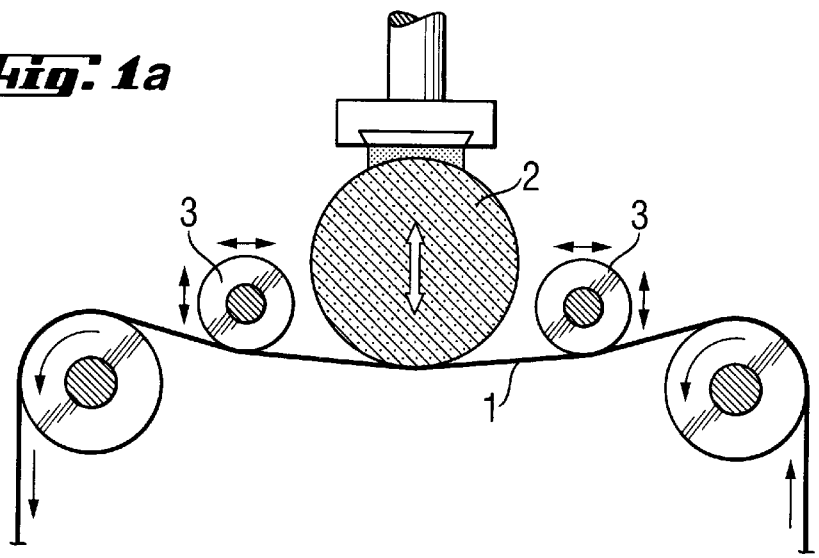
FIG. 1a shows the arrangement of the roll system above the wire web.
Figure 2A:
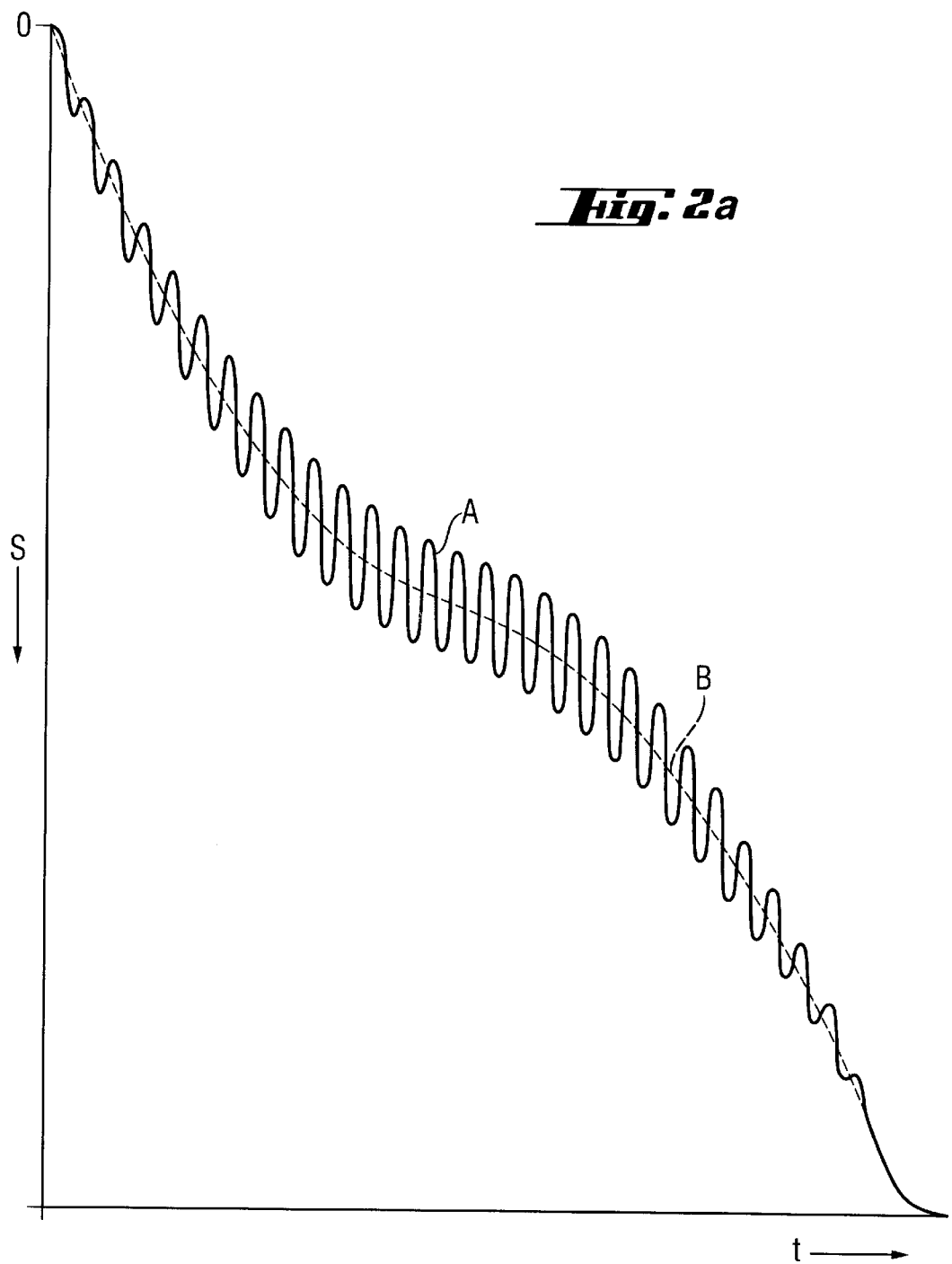
FIG. 2 shows a plot of the movements of the workpiece and of the rolls as a function of the cutting time. (The amplitudes of the oscillating movements are shown not to scale)
Figure 2B:
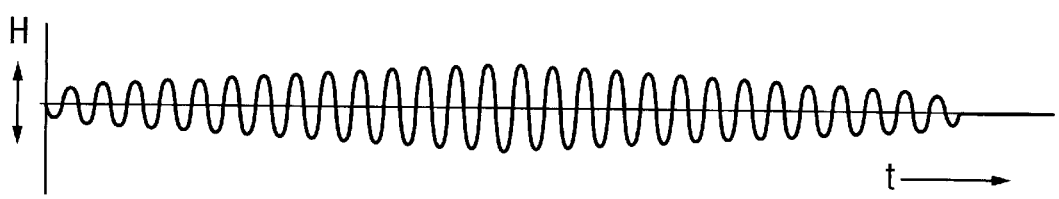

As shown in FIG. 1a, at least one roll 3 of the roll system is pressed perpendicularly or obliquely onto the wire web 1 and is moved back into the starting position. This movement is coupled to a simultaneous movement either of the workpiece 2 or of the second roll, so that the intended wire tension remains substantially unchanged. The movement of the workpiece which is coupled to the roll movement is superimposed on the advancing movement of the workpiece (FIG. 2, top diagram, continuous line). The way in which the wires are lifted off the cutting contour through an angle a is dependent on the travel of the rolls during movement of the rolls. The amplitude of the movement of the rolls, which corresponds to this travel, does not have to be kept constant. Rather, it is preferable for it to be changed as a function of the cutting depth which has been reached. It is particularly preferred to select a low amplitude for a low cutting depth, then to increase this amplitude until a middle cutting depth has been reached, and finally to reduce the amplitude again (FIG. 2, lower diagram), or for the coupled movements to be ended before the maximum cutting depth is reached, which occurs when the slices have been completely separated.

The rate of the advancing movement may likewise be changed as a function of the cutting depth (FIG. 2, upper diagram, dashed line). Furthermore, it is also possible to change the speed of movement of the rolls as a function of the advancing movement. It is expedient for all the movements to be controlled by a computer program which makes use of predetermined parameters.

Figure 1B:
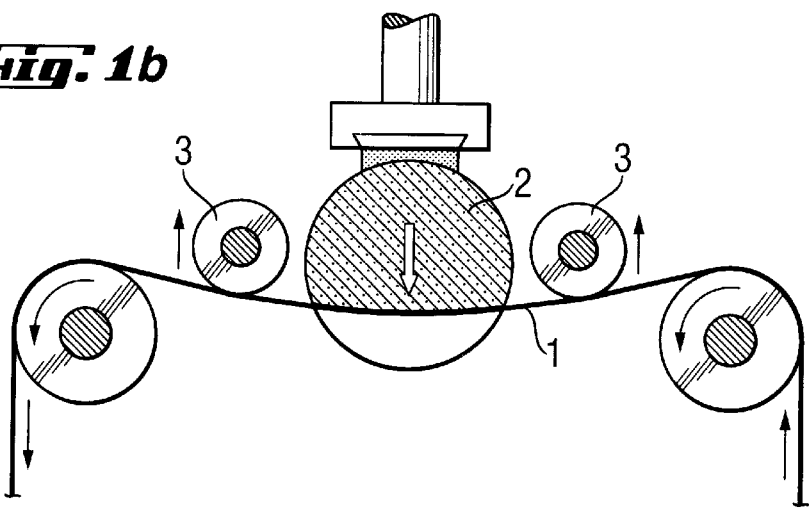
FIGS. 1b and 1c illustrate the movements of the rolls in accordance with a preferred sequence.
Figure 1C:
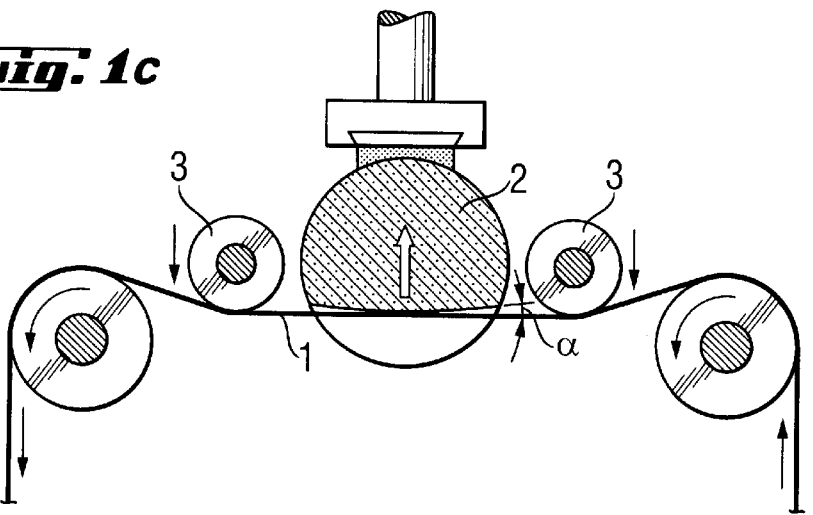

According to a procedure which is shown in FIGS. 1b and 1c, both rolls are simultaneously moved onto the wire web and back, and this movement is coupled to a movement of the workpiece which is directed away from the wire web and toward the wire web. The rolls are moved perpendicularly or obliquely with respect to the wire web. The pressure that the rolls exert on the wire web means that the wire tension, which would otherwise be reduced when the workpiece moves away, is maintained. Then, the movement is reversed, with the rolls and workpiece simultaneously being moved back into their starting positions.

According to an alternative method according to the invention, only one of the rolls is moved onto the wire web and back, and this movement is coupled to a movement of the workpiece which is directed away from the wire web and toward the wire web. The pressure which the roll exerts on the wire web means that the wire tension, which would otherwise be reduced when the workpiece moves away, is maintained. Then, the movement is reversed, with the roll and the workpiece simultaneously being moved back into their starting positions. In a following cycle, this roll or the other roll can again be moved back onto the wire web, this movement being coupled to a movement of the workpiece which is directed away from the wire web.

According to another embodiment, both rolls are moved onto the wire web and back, the movements taking place simultaneously but being oppositely directed with regard to the wire web. Before these movements, initially both rolls press onto the wire web, thus tensioning the wires. The additional pressure which one roll exerts during movement onto the wire web means that the wire tension, which would otherwise be reduced when the other roll moves away from the wire web, is maintained. Then, the movement is reversed, with one roll being moved away from the wire web by the same extent that the other roll is moved toward the wire web.

Figure 1D:
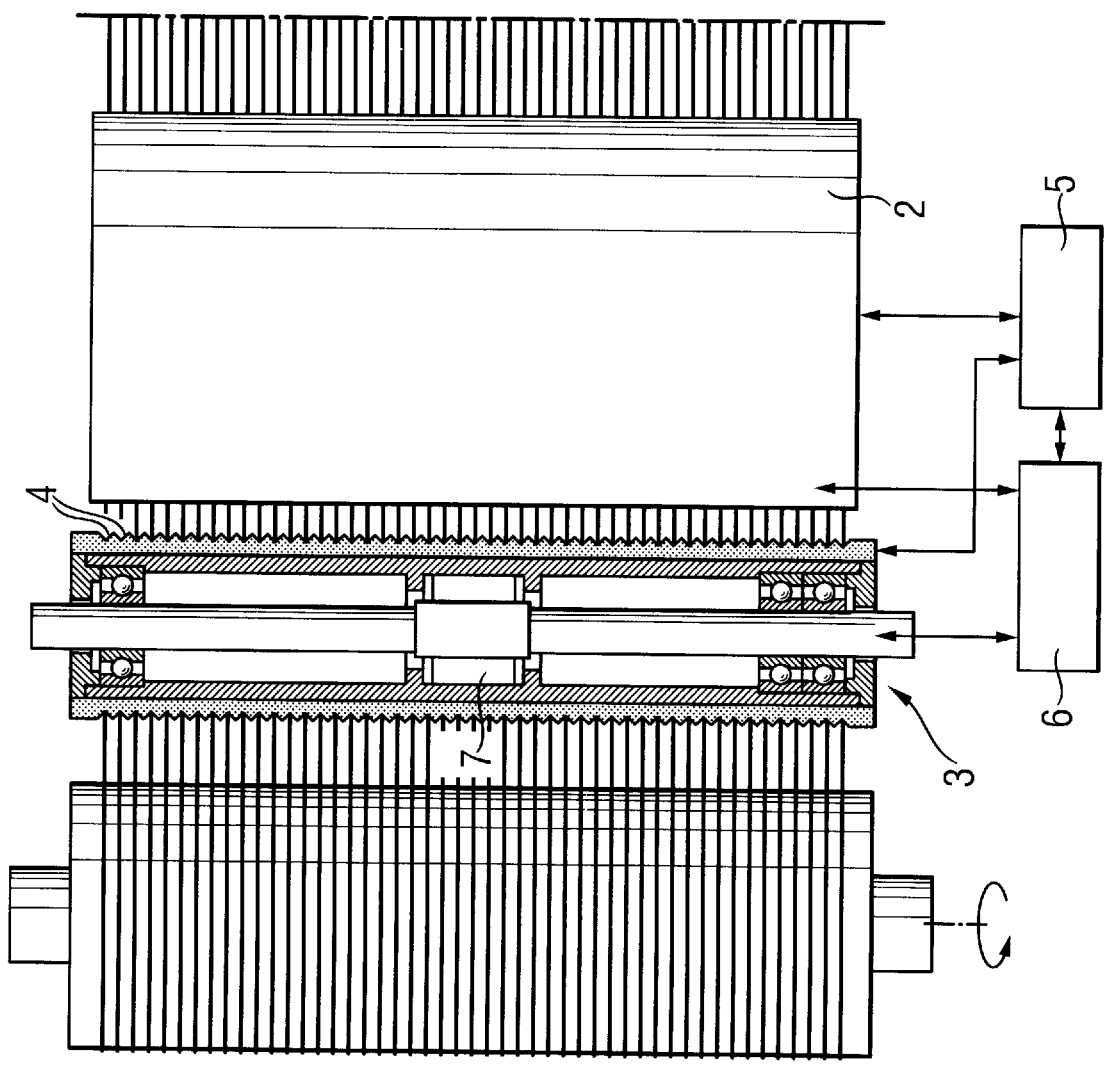
FIG. 1d shows preferred features of a wire saw according to the invention.

The rolls 3 are preferably provided with guide grooves 4 for the wires (FIG. 1d) and, by guiding the wires, perform a task which is usually the responsibility of the wire-guiding rolls which tension the wire web and axially drive the wires. It is possible to effect a reversal, usually periodically, of the axial running direction of the wires as a function of the coupled movement described, of the conventional advancing movement and of the cutting depth which has been reached. To improve the wire guidance, it is advantageous to monitor the axial position of the rolls and their temperature. Regulation 5 of the axial position of the rolls as a function of the position of the workpiece and regulation 6 of the temperature of the rolls as a function of the temperature of the workpiece are particularly preferred.

Furthermore, to improve the geometry of the slices produced, it is proposed to provide each roll of the roll system with a vibration-exciting means 7, which excites transverse vibrations in the wires. The vibration-exciting means may be integrated in the roll, in accordance with the illustration shown in FIG. 1d. However, it may also be arranged spatially separate from the roll and make the roll vibrate via its shaft. The frequencies and amplitudes of the vibrations may be varied as a function of the advancing movement. The wire vibrations help to transport material in the cutting gap and therefore also contribute to smoothing of the cut surfaces and to a reduction in the cutting losses.

Figure 3A:
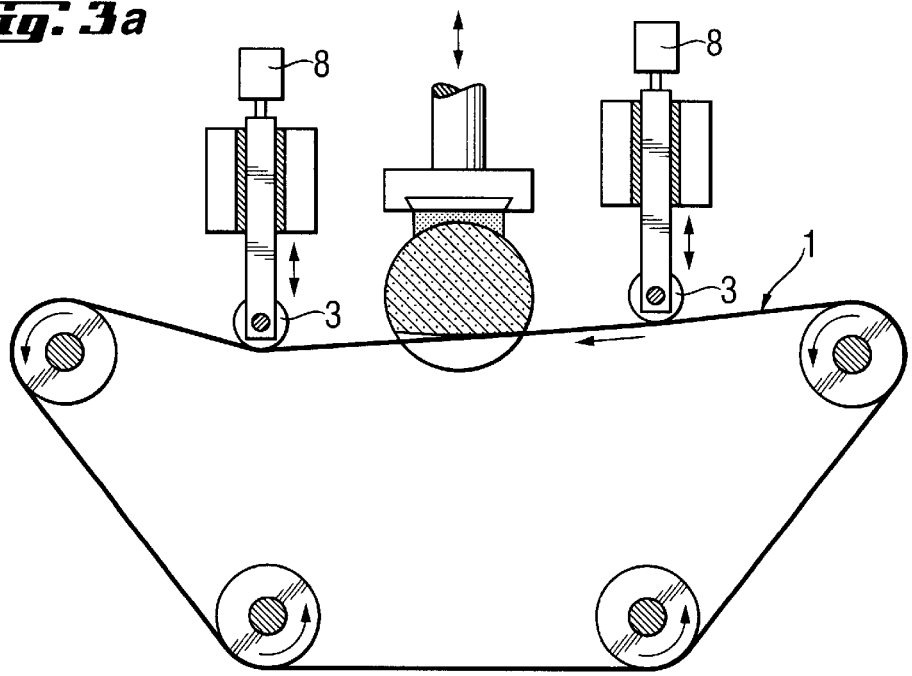
FIG. 3 shows further embodiments of a wire saw which is suitable for carrying out the method.
Figure 3B:
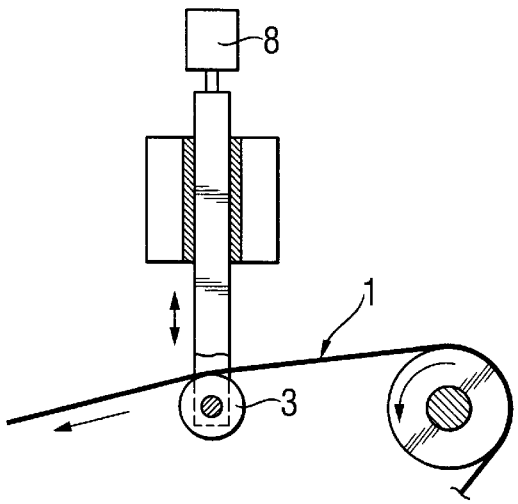
Figure 3C:
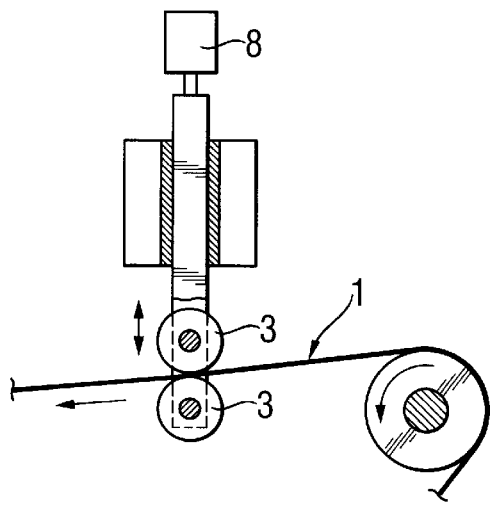

The rolls may, for example, be moved with the aid of an actuator 8 (FIG. 3). They are arranged above the wire web or, in accordance with alternatives 1 and 2 shown in FIG. 3, may also be arranged below the wire web or as roll pairs. In this case, one roll of a roll pair lies above the wire web, while the other roll of the roll pair lies below the wire web.

Accordingly, while only a few embodiments of the present invention have been shown and described, it is obvious that many changes and modifications may be made thereunto without departing from the spirit and scope of the invention.

What is claimed is:

1. A method for separating slices from a hard brittle workpiece, comprising:

subjecting the workpiece to an advancing movement;

pressing the workpiece onto wires of a wire web of a wire saw, the wires being under a defined wire tension and making contact with the workpiece over a cutting depth along a cutting contour; and lifting the wires off the cutting contour a number of times while the wire tension is kept substantially unchanged, with the aid of rolls of a roll system, said step of lifting comprising moving at least one roll in a direction toward the wire web and then in a direction away from the wire web, wherein the roll system comprises at least two moveable rolls which flank the workpiece.

2. The method as claimed in claim 1, wherein the rolls are simultaneously moved in a direction toward the wire web and in a direction away from of said wire web, and wherein said simultaneous movement is coupled to a movement of the workpiece which is directed away from and toward the wire web and is superimposed on the advancing movement.

3. The method as claimed in claim 1, wherein the rolls are moved simultaneously and in opposite directions toward and away from said wire web.

4. The method as claimed in claim 1, wherein one of the rolls is moved in a direction toward the wire web and in a direction away from the wire web, and this movement is coupled to a movement of the workpiece which is directed away from the wire web and toward the wire web and is superimposed on the advancing movement.

5. The method as claimed in claim 1, wherein at least one of said rolls is moved with an amplitude, and the amplitude of the movement is changed as a function of cutting depth.

6. The method as claimed in claim 1, wherein at least one of said rolls is moved with a frequency, and the frequency of the movement is varied as a function of the cutting depth.

7. The method as claimed in claim 1, wherein the wires are moved in an axial direction with a changing running direction, and the change in the running direction takes place as a function of the movement of the workpiece, of the movement of the rolls and as a function of cutting depth.

8. The method as claimed in claim 1, wherein the movements of the rolls and of the workpiece are controlled with the aid of a computer program.

9. The method as claimed in claim 1, wherein the wires are excited to vibrate with the aid of the rolls.

10. The method as claimed in claim 1, wherein a temperature of the rolls is regulated as a function of a temperature of the workpiece.

11. The method as claimed in claim 1, wherein an axial position of at least one of the rolls is regulated as a function of a position of the workpiece.

12. A wire saw having a wire web for separating slices from a hard brittle material, said wire saw comprising a roll system which comprises at least two rolls which flank the workpiece and are moved in a direction toward the wire web and in a direction away from the wire web.

13. The wire saw as claimed in claim 12, wherein the rolls are arranged above the wire web.

14. The wire saw as claimed in claim 12, wherein the rolls are arranged below the wire web.

15. The wire saw as claimed in claim 12, wherein the rolls are arranged as roll pairs on both sides of the wire web.

16. The wire saw as claimed in claim 12, further comprising a vibration-exciting means accommodated in the rolls.

17. The wire saw as claimed in claim 12, further comprising vibration-exciting means which are positioned to be spatially separate from the rolls and make the rolls vibrate via their shafts.

18. The wire saw as claimed in claim 12, further comprising a regulating device for regulating temperature and axial position of the rolls as a function of temperature and position of the workpiece.

19. The wire saw as claimed in claim 12, wherein grooves are provided on the surface of the rolls, for the purpose of guiding the wires.

* * * * *